(12) United States Patent
Cheng et al.

(10) Patent No.: US 12,294,460 B2
(45) Date of Patent: May 6, 2025

(54) METHOD AND APPARATUS FOR TRANSMITTING HARQ FEEDBACK

(71) Applicant: SHARP KABUSHIKI KAISHA, Sakai (JP)

(72) Inventors: Yu-Hsin Cheng, Taipei (TW); Yung-Lan Tseng, Taipei (TW); Mei-Ju Shih, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 438 days.

(21) Appl. No.: 17/628,399

(22) PCT Filed: Aug. 14, 2020

(86) PCT No.: PCT/CN2020/109132
§ 371 (c)(1),
(2) Date: Jan. 19, 2022

(87) PCT Pub. No.: WO2021/031995
PCT Pub. Date: Feb. 25, 2021

(65) Prior Publication Data
US 2022/0271868 A1 Aug. 25, 2022

Related U.S. Application Data

(60) Provisional application No. 62/888,051, filed on Aug. 16, 2019.

(51) Int. Cl.
*H04W 72/12* (2023.01)
*H04L 1/1607* (2023.01)
(Continued)

(52) U.S. Cl.
CPC ....... *H04L 1/1671* (2013.01); *H04W 72/1263* (2013.01); *H04W 72/23* (2023.01)

(58) Field of Classification Search
None
See application file for complete search history.

(56) References Cited

U.S. PATENT DOCUMENTS 11,929,830 B2 *  3/2024  Hwang ................. H04W 72/20
2014/0098719 A1  4/2014  Kim et al.
(Continued)

FOREIGN PATENT DOCUMENTS

CN    104685955 A   6/2015
CN    104812086 A   7/2015
(Continued)

OTHER PUBLICATIONS

Huawei, HiSilicon, "Sidelink resource allocation mode 1", R1-1911883, 3GPP TSG RAN WG1 Meeting #99, Reno, USA, Nov. 18-22, 2019.
(Continued)

*Primary Examiner* — Kodzovi Acolatse
(74) *Attorney, Agent, or Firm* — ScienBiziP, P.C.

(57) ABSTRACT

A user equipment (UE) and a method for transmitting hybrid automatic repeat request (HARQ) feedback are provided. The method includes: receiving a physical uplink control channel (PUCCH) configuration that indicates a specific PUCCH format of a PUCCH and whether a sidelink (SL) HARQ feedback is allowed to be transmitted on the PUCCH; generating a first HARQ feedback in response to first data received via a physical downlink shared channel (PDSCH); generating a second HARQ feedback in response to second data received via a physical sidelink shared channel (PSSCH); and transmitting uplink control information (UCI) including at least a portion of the first HARQ feedback and at least a portion of the second HARQ feedback via the PUCCH in a case that the PUCCH configuration indicates that the SL HARQ feedback is allowed to be
(Continued)

transmitted on the PUCCH and the first HARQ feedback overlaps the second HARQ feedback in a time domain.

18 Claims, 6 Drawing Sheets

(51) Int. Cl.
*H04W 72/1263* (2023.01)
*H04W 72/23* (2023.01)

(56) References Cited

U.S. PATENT DOCUMENTS

| | | |
|---|---|---|
| 2015/0358138 A1 | 12/2015 | Hwang et al. |
| 2019/0190662 A1 | 6/2019 | Lee et al. |
| 2019/0261383 A1 | 8/2019 | Kwak et al. |
| 2021/0144750 A1* | 5/2021 | Cao ............... H04W 72/0453 |
| 2021/0289529 A1* | 9/2021 | Hosseini ............... H04W 72/20 |
| 2021/0377989 A1* | 12/2021 | Chae ............... H04L 1/1861 |
| 2022/0103292 A1* | 3/2022 | Hwang ............... H04L 1/1812 |
| 2022/0279504 A1* | 9/2022 | Ko ............... H04W 72/21 |
| 2022/0321308 A1* | 10/2022 | Yu ............... H04L 1/1812 |
| 2022/0394702 A1* | 12/2022 | Lee ............... H04L 1/1812 |
| 2023/0050088 A1* | 2/2023 | Wu ............... H04W 24/08 |

FOREIGN PATENT DOCUMENTS

| | | |
|---|---|---|
| CN | 105553612 A | 5/2016 |
| CN | 106165510 A | 11/2016 |
| CN | 108616339 A | 10/2018 |
| CN | 108924960 A | 11/2018 |
| CN | 109964434 A | 7/2019 |
| WO | 2017171528 A1 | 10/2017 |
| WO | 2018084610 A1 | 5/2018 |
| WO | WO-2023212075 A1 * | 11/2023 ........... H04L 1/1854 |

OTHER PUBLICATIONS

Huawei, HiSilicon, "Sidelink resource allocation mode 1", R1-1910055, 3GPP TSG RAN WG1 Meeting #98bis, Chongqing, China, Oct. 14-20, 2019.

Ericsson, "Handling collisions of sTTI and TTI in UL", R1-1708841, 3GPP TSG-RAN WG1 Meeting #89, Hangzhou, P. R. China May 15-19, 2017.

Huawei, HiSilicon, "Discussion on HARQ support for NR sidelink", R2-1907414, 3GPP TSG-RAN WG2 #106, Reno, USA, May 13-17, 2019.

3GPP TS 38.213, "3rd Generation Partnership Project; Technical Specification Group Radio Access Network; NR; Physical layer procedures for control (Release 15)", V15.3.0 (Sep. 2018).

Fujitsu, "Discussion on HARQ-ACK feedback for NR-V2X", R1-1901944, 3GPP TSG RAN WG1 #96, Athens, Greece, Feb. 25-Mar. 1, 2019 (Mar. 1, 2019).

Ericsson, "Transmission of sidelink HARQ feedback to gNB for mode 1 scheduling", R1-1901227, 3GPP TSG-RAN WG1 Meeting # ah-1901, Taipei, Taiwan, Jan. 21-25, 2019 (Jan. 25, 2019).

Ericsson, "On Mode-1 HARQ indication to gNB", R1-1907138, 3GPP TSG-RAN WG1 Meeting #97, Reno, US, May 13-17, 2019 (May 4, 2019).

Yi He, "Research and Implementation of Multi-User Downlink Data Sharing Channel Baesd [sp] on TDD-LTE Technology", Information Technology Series, Aug. 15, 2018.

Sam Guirguis et al., "M2M communications: Enablement in 4G LTE, deployment considerations and evolution path to 5G", 2017 International Conference on Wireless Networks and Mobile Communications, Dec. 25, 2017.

\* cited by examiner

METHOD AND APPARATUS FOR TRANSMITTING HARQ FEEDBACK

CROSS-REFERENCE TO RELATED APPLICATION(S)

This application is a national stage application, filed under 35 U.S.C. § 371, of International Patent Application No. PCT/CN2020/109132, filed on Aug. 14, 2020, which claims the benefit of and priority to U.S. Provisional Patent Application Ser. No. 62/888,051, filed on Aug. 16, 2019, entitled "Mechanism for HARQ feedback of sidelink resource allocation mode 1". The contents of all above-named applications are hereby fully incorporated herein by reference for all purposes.

FIELD

The present disclosure is related to wireless communication, and more particularly, to a method for handling a hybrid automatic repeat request (HARQ) feedback in cellular wireless communication networks.

BACKGROUND

With the tremendous growth in the number of connected devices and the rapid increase in user/network traffic volume, various efforts have been made to improve different aspects of wireless communication for cellular wireless communication systems, such as fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is directed to a method for handling HARQ feedback in cellular wireless communication networks.

In a first aspect of the present disclosure, a method for transmitting HARQ feedback by a UE is provided. The method includes: receiving, from a base station (BS), a physical uplink control channel (PUCCH) configuration for configuring a PUCCH, the PUCCH configuration indicating a specific PUCCH format of the PUCCH and whether a sidelink (SL) HARQ feedback is allowed to be transmitted on the PUCCH; generating a first HARQ feedback in response to first data received from the BS via a physical downlink shared channel (PDSCH); generating a second HARQ feedback in response to second data received from another UE via a physical sidelink shared channel (PSSCH); and transmitting, to the BS, uplink control information (UCI) including at least a portion of the first HARQ feedback and at least a portion of the second HARQ feedback via the PUCCH in a case that the PUCCH configuration indicates that the SL HARQ feedback is allowed to be transmitted on the PUCCH and the first HARQ feedback overlaps the second HARQ feedback in a time domain.

In an implementation of the first aspect, the specific PUCCH format is one of a PUCCH format 0, a PUCCH format 1, a PUCCH format 2, a PUCCH format 3, and a PUCCH format 4.

In another implementation of the first aspect, another portion of at least one of the first HARQ feedback and the second HARQ feedback is discarded in the UCI.

Another implementation of the first aspect further comprises transmitting one of the first HARQ feedback and the second HARQ feedback in a case that the PUCCH configuration indicates that the SL HARQ feedback is not allowed to be transmitted on the PUCCH and the first HARQ feedback overlaps the second HARQ feedback in the time domain.

Another implementation of the first aspect further comprises performing a prioritization procedure to determine which one of the first HARQ feedback and the second HARQ feedback is to be transmitted.

Another implementation of the first aspect further comprises transmitting, to the BS, a UE capability that indicates whether the UE supports multiplexing the first HARQ feedback with the second HARQ feedback.

Another implementation of the first aspect further comprises performing a prioritization procedure according to the first HARQ feedback, the second HARQ feedback, a prioritization rule, and a payload size of the PUCCH to determine the UCI.

In another implementation of the first aspect, the PSSCH is scheduled by sidelink control information (SCI) that includes a priority indicator of the second HARQ feedback.

In another implementation of the first aspect, the PUCCH is further used for transmitting a scheduling request (SR) and a channel state information (CSI) report; the first HARQ feedback includes HARQ control information for a first service type and HARQ control information for a second service type; and the prioritization rule indicates a prioritization order of the HARQ control information for the first service type, the HARQ control information for the second service type, the SR, and the CSI report.

Another implementation of the first aspect further comprises receiving a message that indicates whether a HARQ codebook type of the second HARQ feedback is semi-static or dynamic.

In a second aspect of the present disclosure, a UE for transmitting HARQ feedback is provided that includes one or more non-transitory computer-readable media containing computer-executable instructions embodied therein and at least one processor coupled to the one or more non-transitory computer-readable media. The at least one processor is configured to execute the computer-executable instructions to: receive, from a BS, a PUCCH configuration for configuring a PUCCH, the PUCCH configuration indicating a specific PUCCH format of the PUCCH and whether a SL HARQ feedback is allowed to be transmitted on the PUCCH; generate a first HARQ feedback in response to first data received from the BS via a PDSCH; generate a second HARQ feedback in response to second data received from another UE via a PSSCH; and transmit, to the BS, UCI including at least a portion of the first HARQ feedback and at least a portion of the second HARQ feedback via the PUCCH in a case that the PUCCH configuration indicates that the SL HARQ feedback is allowed to be transmitted on the PUCCH and the first HARQ feedback overlaps the second HARQ feedback in a time domain.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DETAILED DESCRIPTION

Figure 1:
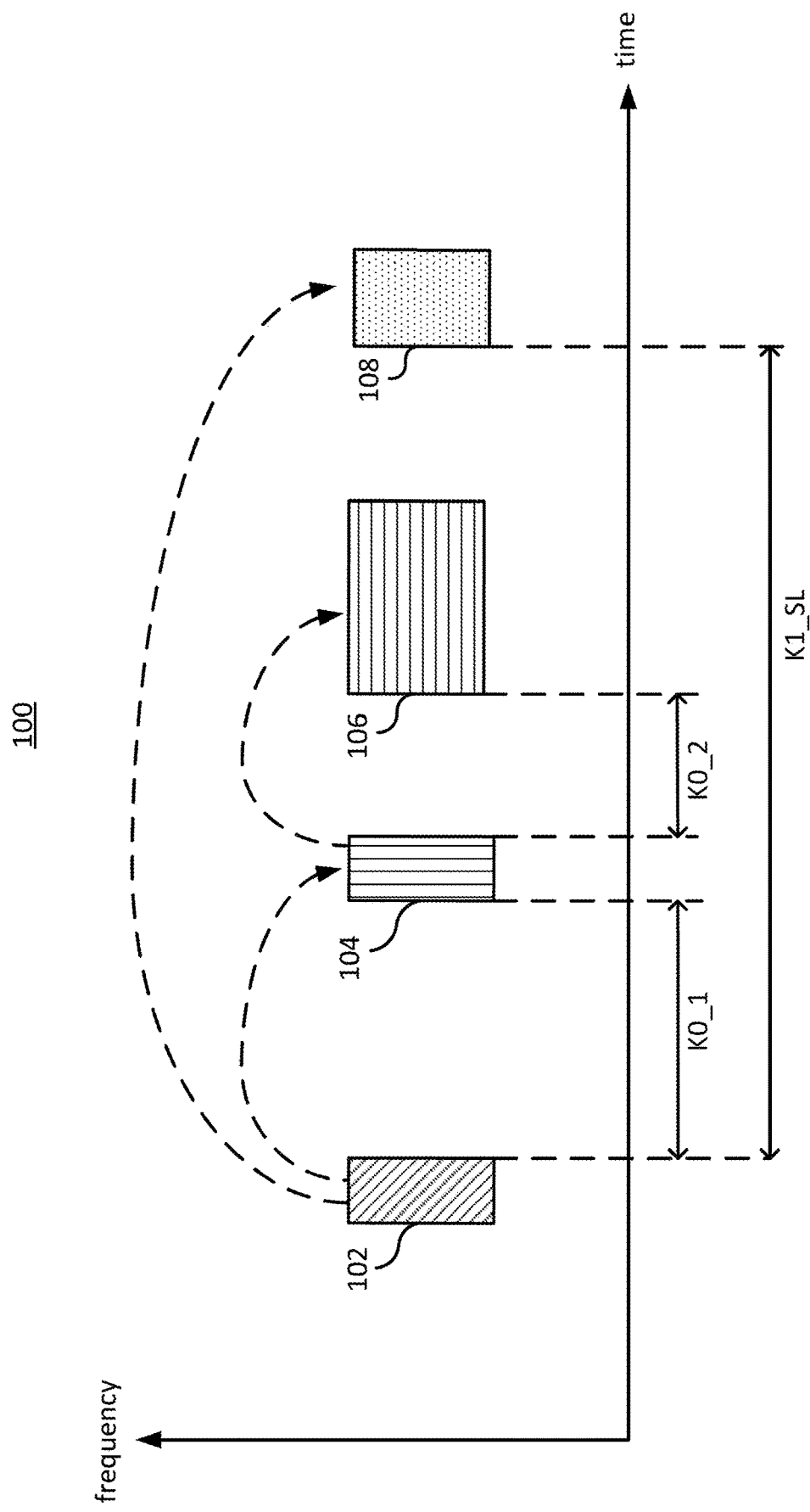
FIG. 1 is a diagram illustrating an example SL resource allocation mode according to an example implementation of the present disclosure.

The following description contains specific information related to implementations of the present disclosure. The drawings and their accompanying detailed description are merely directed to implementations.

However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the drawings. However, the features in different implementations may be different in other respects and shall not be narrowly confined to what is shown in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that multiple relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the present disclosure. In other examples, detailed description of well-known methods, technologies, systems, and architectures are omitted so as not to obscure the description with unnecessary details.

Persons skilled in the art will recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the present disclosure is directed to software installed and executing on computer hardware, alternative implementations as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Abbreviations of several terms mentioned in the present disclosure are explained as follows:
  CSI: channel state information
  PRB: physical resource block
  RRC: radio resource control
  SR: scheduling request
  SL-RRC: RRC signaling transmitted on SL channel
  SIB-SL: System Information Block transmitted on SL channel
  MIB-SL: Master Information Block transmitted on SL channel
  UCI: Uplink control information, which may include SR, HARQ, and CSI feedback There are multiple resource allocation modes for SL transmission. In resource allocation mode 1, a BS (e.g., a gNB) may schedule SL resource(s) to be used by UE for SL transmission(s) for unicast and groupcast. A transmitter UE (also referred to as Tx UE) may transmit a transport block (TB) to a receiver UE (also referred to as Rx UE) on the SL resource scheduled by the BS. The Rx UE may send HARQ feedback to the Tx UE. The HARQ feedback may be a one-bit signal indicating acknowledgement (ACK) or negative acknowledgement (NACK). The HARQ feedback may also be referred to as HARQ-ACK information in the present disclosure. In one implementation, the Tx UE may report HARQ feedback (also referred to as SL HARQ feedback) via Uu link to the BS. For example, the Tx UE may indicate to the BS a need for retransmission of the transmitted TB by using the SL HARQ feedback. Since the HARQ feedback is transmitted via Uu link, the UE may use PUCCH and/or physical uplink shared channel (PUSCH) to transmit HARQ bits.

According to the HARQ codebook generation procedure described in 3GPP TS 38.213, a HARQ codebook may be associated with two values K0 and K1. The value K0 may be in an information element (IE) PDSCH-TimeDomainResourceAllocationList. The value K1 may be in an IE dl-DataToUL-ACK. K0 may be an offset between the DL slot in which the PDCCH for DL scheduling is received and the DL slot in which PDSCH data is scheduled. K1 may be an offset between the DL slot in which the data is scheduled on PDSCH and the UL slot in which the HARQ feedback for the scheduled PDSCH data needs to be sent.

In one implementation, downlink control information (DCI) in SL resource allocation mode 1 (e.g., DCI_SL) may contain resource allocation information about physical sidelink control channel (PSCCH) and/or physical sidelink shared channel (PSSCH). New parameters, such as K0_1, K0_2, K0_SL and K1_SL, may be introduced.

FIG. 1 is a diagram 100 illustrating an example SL resource allocation mode according to an example implementation of the present disclosure. The UE may receive DCI (e.g., DCI_SL) in PDCCH 102 that schedules PSCCH 104, which may carry sidelink control information (SCI) that schedules PSSCH 106. PDCCH 102 may also schedule PUCCH 108, which may be used for transmitting, to a BS, HARQ feedback associated with the PSSCH 106. The parameter K0_1 may indicate a time offset between the PDCCH 102 and the PSCCH 104. The parameter K0_2 may indicate a time offset between the PSCCH 104 and the PSSCH 106. The parameter K1_SL may indicate a time offset between the PDCCH 102 and the PUCCH 108.

Figure 2:
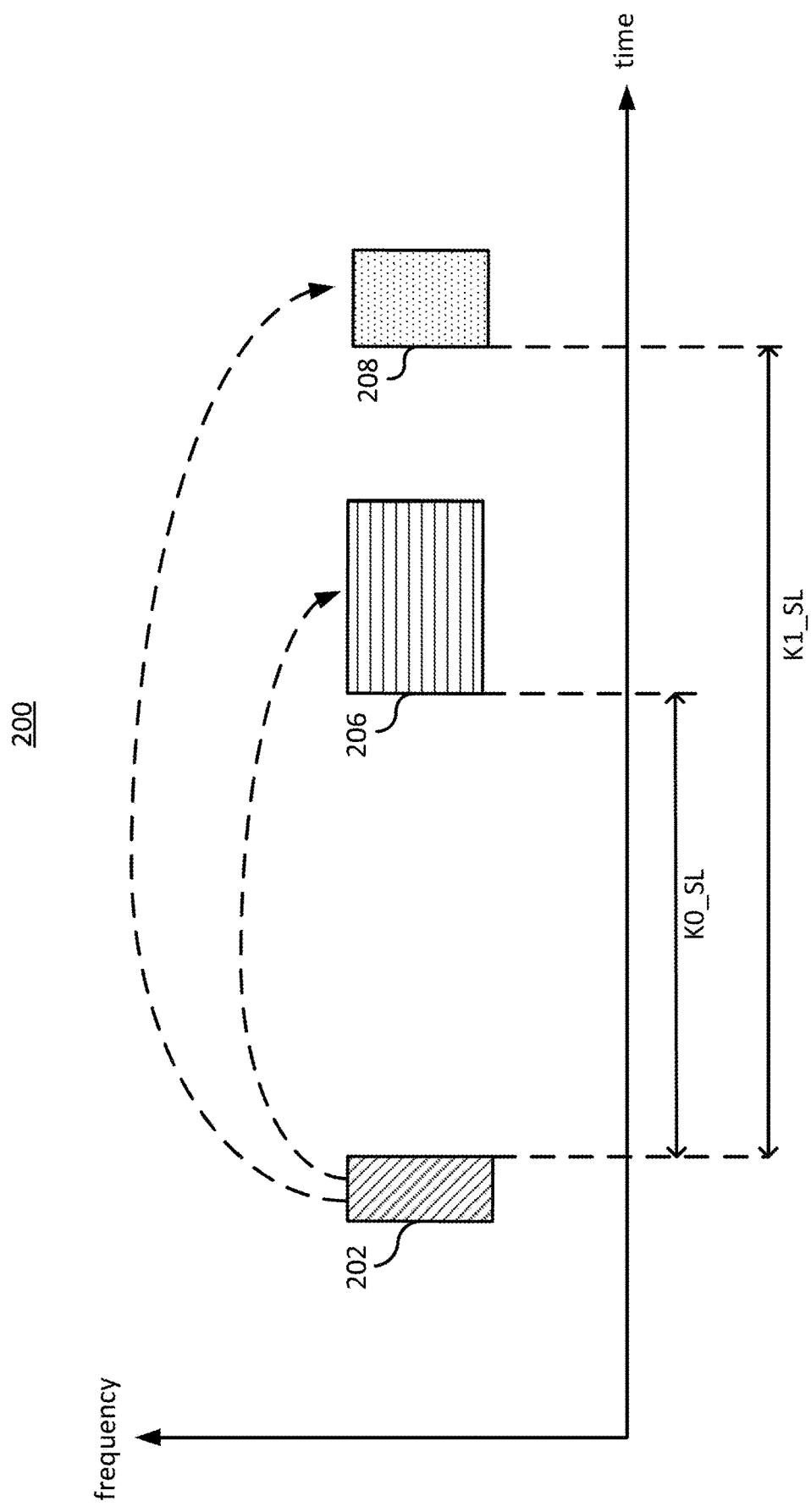
FIG. 2 is a diagram illustrating another example SL resource allocation mode according to an example implementation of the present disclosure.

FIG. 2 is a diagram 200 illustrating another example SL resource allocation mode according to an example implementation of the present disclosure. The UE may receive DCI (e.g., DCI_SL) in PDCCH 202 that schedules PSSCH 206. The PDCCH 202 may also schedule PUCCH 208, which may be used for transmitting, to a BS, HARQ feedback associated with the PSSCH 206. The parameter K0_SL may indicate a time offset between the PDCCH 202 and the PSSCH 206. The parameter K1_SL may indicate a time offset between the PDCCH 202 and the PUCCH 208.

Case 1: Generating HARQ Codebook for SL Resource Allocation Mode 1

Case 1-1: Excluding PSSCH/PSCCH Candidate

In one implementation, if at least one symbol of a PSSCH candidate time resource indicated by SCI is configured as DL or flexible (FL), the PSSCH candidate may be excluded from a PSSCH candidate list. Remaining PSSCH candidates may be denoted as valid PSSCH candidates. For example, a parameter K0_2 may be configured via RRC signaling as K0_2={0,1,2,3}. The parameter K0_2 may indicate a time offset between PSCCH and PSSCH. The UE may receive SCI in slot n, and the PSSCH candidate may be in slot n+0, slot n+1, slot n+2, or slot n+3, where n is an integer. The UE may exclude a PSSCH candidate scheduled by the SCI from a PSSCH candidate list if the PSSCH candidate overlaps with a DL/FL symbol.

In one implementation, if at least one symbol of a PSSCH candidate time resource indicated by DCI_SL is configured as DL/FL, the PSSCH candidate may be excluded from a PSSCH candidate list. Remaining PSSCH candidates may be denoted as valid PSSCH candidates. For example, a parameter K0_SL may be configured via RRC signaling as K0_SL={0,1,2,3}. The parameter K0_SL may indicate a time offset between PDCCH and PSSCH. The UE may receive DCI_SL in slot n, and the PSSCH candidate may be in slot n+0, slot n+1, slot n+2, or slot n+3, where n is an integer. The UE may exclude a PSSCH candidate scheduled by the DCI_SL from a PSSCH candidate list if the PSSCH candidate overlaps with a DL/FL symbol.

In one implementation, if at least one symbol of a PSCCH candidate time resource indicated by a DCI_SL is configured as DL/FL, the PSCCH candidate may be excluded from a PSCCH candidate list. Remaining PSCCH candidates may be denoted as valid PSCCH candidates. For example, a parameter K0_1 may be configured via RRC as K0_1={0, 1,2,3}. The parameter K0_1 may indicate a time offset between PDCCH and PSCCH. The UE may receive DCI_SL in slot n, and the PSCCH candidate may be in slot n+0, slot n+1, slot n+2, or slot n+3, where n is an integer. The UE may exclude a PSCCH candidate scheduled by the DCI_SL from a PSCCH candidate list if the PSCCH candidate overlaps with a DL/FL symbol.

Case 1-2: Generating HARQ Codebook According to sl-DataToUL-ACK and/or PSSCH Time Domain Resource Allocation In one implementation, the UE may report SL HARQ-ACK information in a PUCCH associated with only one (or X, X being a positive integer) PSSCH for all PSSCH candidates. The UE may expect to only receive one PSSCH successfully before the UE reports the SL HARQ feedback. In one implementation, the value X may be reported by UE capability. The UE may transmit, to the BS, a UE capability that indicates a maximum number of bits in the SL HARQ feedback.

Case 2: Configuration of SL HARQ Codebook Type

In one implementation, the UE may receive a message that indicates whether a HARQ codebook type for SL transmission is semi-static or dynamic. In one implementation, there may be a new IE SL-HARQ-ACK-Codebook contained in RRC/SL-RRC/SIB/SIB-SL/MIB-SL. The IE SL-HARQ-ACK-Codebook may indicate SL HARQ-ACK codebook is either semi-static or dynamic.

The IE SL-HARQ-ACK-Codebook may be configured per resource pool (e.g., resource pool for scheduled PSCCH and/or PSSCH), per bandwidth part (BWP) (e.g., DL BWP, SL BWP, UL BWP), per anchor carrier, per cell, per cell group (e.g., master cell group, secondary cell group), or per UE. In one implementation, the IE SL-HARQ-ACK-Codebook may be valid in specific areas, which may be indicated by an IE systemInformationAreaID, a list of (physical) cell identities, zones, ranges, etc.

The IE HARQ-ACK-Codebook may indicate an SL HARQ codebook type. An example data structure of the IE SL-HARQ-ACK-Codebook may be provided as follows. In one implementation, if the IE SL-HARQ-ACK-Codebook is not configured, the default value may be "semi-static" or "dynamic."

```
SL-HARQ-ACK-Codebook ::=  ENUMERATED {
    semi-static, dynamic, all, spare1
    }
```

In one implementation, the SL HARQ codebook type may be the same as the HARQ codebook type of a cell that contains scheduling information (e.g., DCI_SL). In one implementation, a HARQ codebook type of a HARQ feedback associated with a PSSCH scheduled by a BS may be the same as a HARQ codebook type configured by the BS for transmitting HARQ feedback associated with a PDSCH. For example, the UE may be configured to perform SL transmission on cell #0. The HARQ codebook type associated with a PDSCH on cell #0 may be dynamic. In one implementation, an IE pdsch-HARQ-ACK-Codebook of cell #0 may indicate that HARQ codebook type on cell #0 is "dynamic codebook." The UE may expect to generate a dynamic HARQ codebook for SL transmission. That is, the UE may expect that SCI or DCI_SL indicates a downlink assignment index for SL (e.g., SL_DAI) for the dynamic SL HARQ codebook.

In one implementation, the SL HARQ codebook type may be included in UE capability. The UE may inform the BS whether it supports dynamic/semi-static/both HARQ codebook type for SL operation.

Case 3: Multiplexing UCI and SL HARQ feedback

Figure 3:
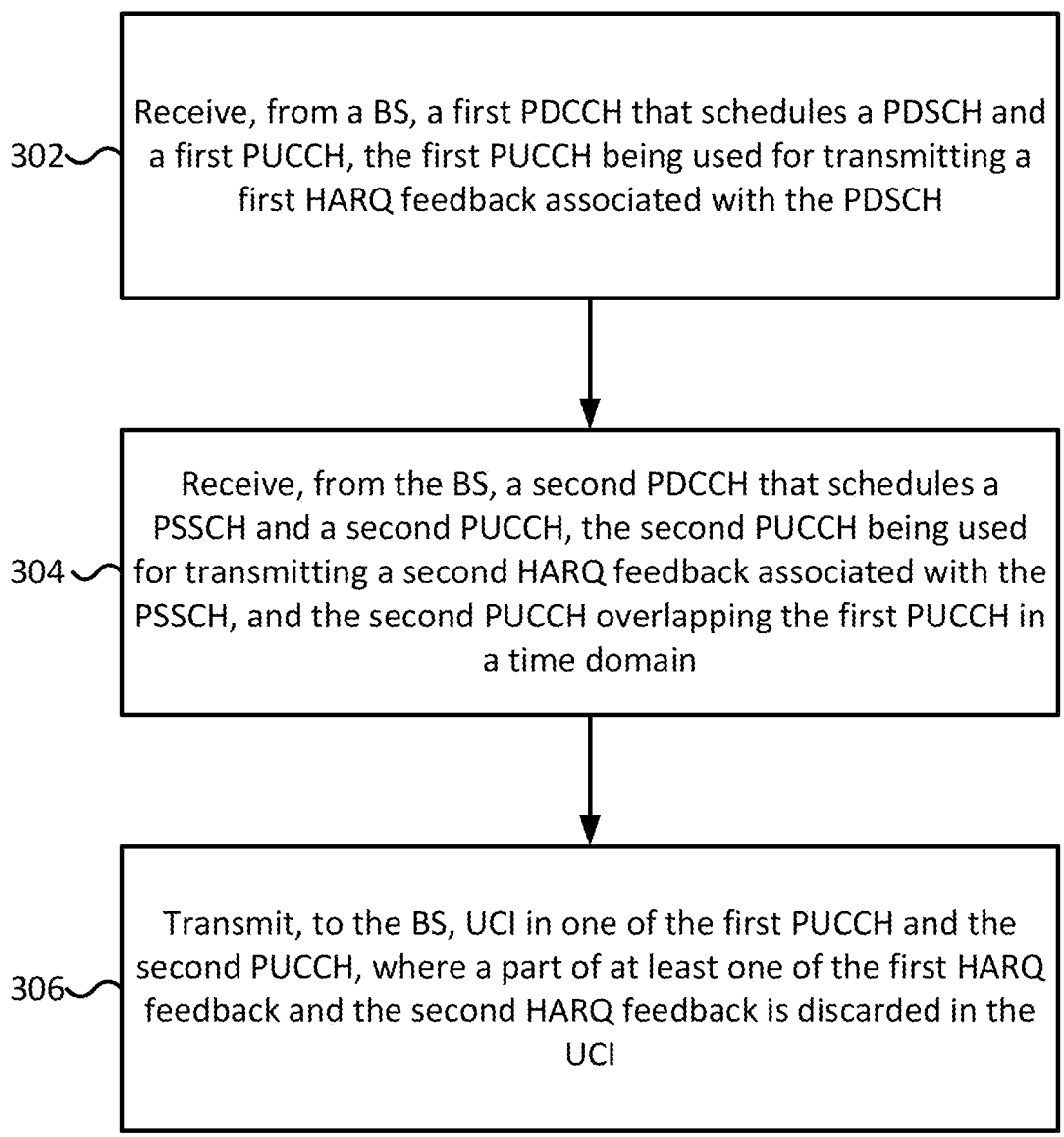
FIG. 3 is a flowchart of a method performed by a UE for handling HARQ feedback according to an example implementation of the present disclosure.

FIG. 3 is a flowchart of a method 300 performed by a UE for handling HARQ feedback according to an example implementation of the present disclosure. In action 302, the UE may receive, from a BS, a first PDCCH that schedules a PDSCH and a first PUCCH. The first PUCCH may be used for transmitting a first HARQ feedback associated with the PDSCH. The first HARQ feedback may be also referred to as HARQ feedback for PDSCH, DL HARQ feedback, or Uu HARQ feedback.

In action 304, the UE may receive, from the BS, a second PDCCH that schedules a PSSCH and a second PUCCH. The second PUCCH may be used for transmitting a second HARQ feedback associated with the PSSCH. The second HARQ feedback may be also referred to as HARQ feedback for PSSCH or SL HARQ feedback. The second PUCCH overlaps the first PUCCH in a time domain (also referred to as PUCCH conflict). In one implementation, the second PUCCH and the first PUCCH may be different, and the second PUCCH may partially or fully overlap the first PUCCH in the time domain. In one implementation, the second PUCCH may be the same as the first PUCCH. That is, the UE may be indicated to transmit the first HARQ feedback and the second HARQ feedback in the same PUCCH resource.

In action 306, the UE may transmit, to the BS, UCI in one of the first PUCCH and the second PUCCH, where a part of at least one of the first HARQ feedback and the second HARQ feedback is discarded in the UCI. In one implementation, the UE may multiplex the first HARQ feedback with the second HARQ feedback in one of the first PUCCH and the second PUCCH. In one implementation, the UE may discard part of the first HARQ feedback and/or part of the second HARQ feedback when multiplexing the first HARQ feedback with the second HARQ feedback. In one implementation, the UE may drop/discard (part of) the first HARQ feedback in the UCI. In one implementation, the UE may drop/discard (part of) the second HARQ feedback in the UCI. In one implementation, the UCI may include only one of the first HARQ feedback and the second HARQ feedback.

Figure 4:
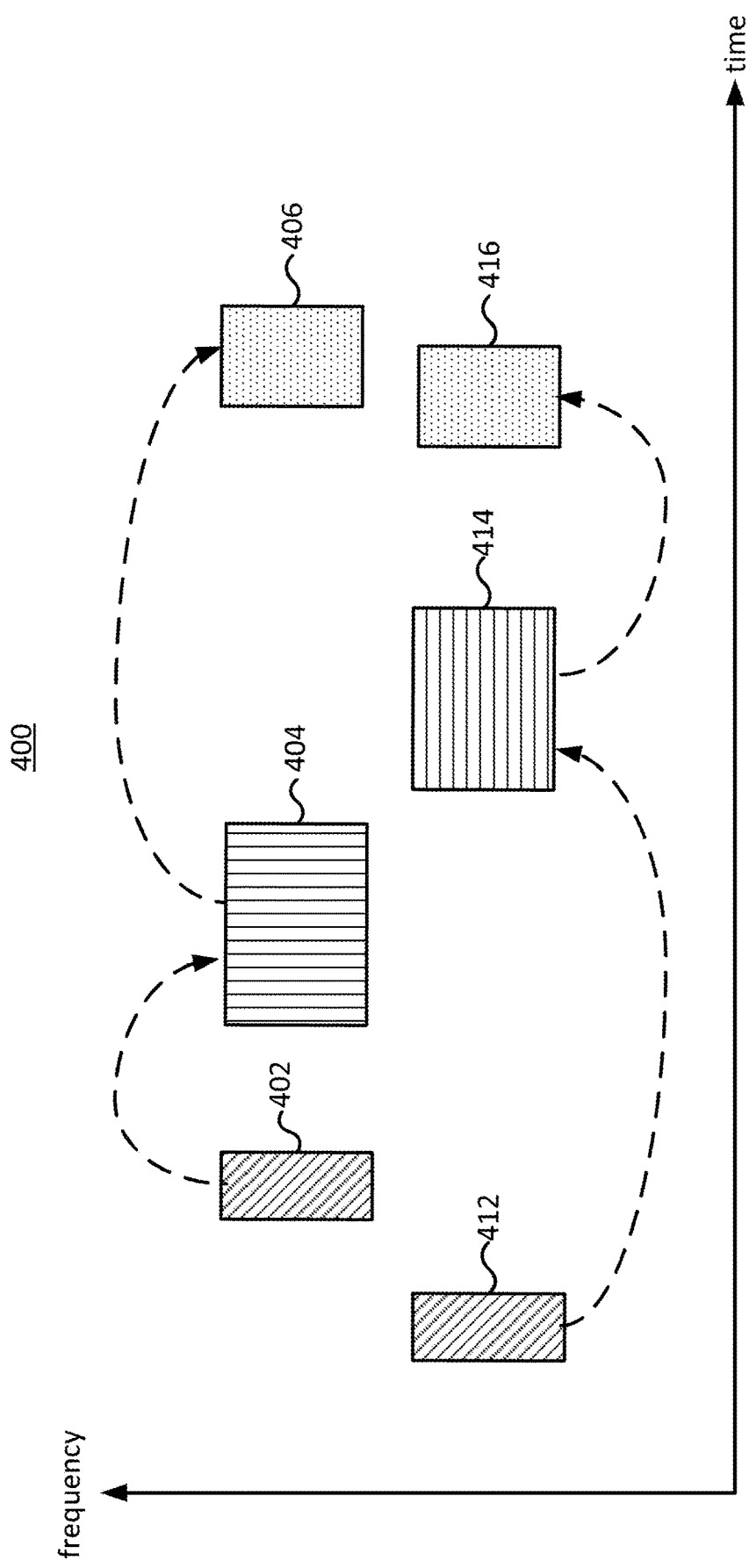
FIG. 4 is a diagram illustrating an example PUCCH conflict scenario according to an example implementation of the present disclosure.

FIG. 4 is a diagram 400 illustrating an example PUCCH conflict scenario according to an example implementation of the present disclosure. The UE may receive, from a BS, a first PDCCH 402 that schedules a PDSCH 404 and a first PUCCH 406. The first PUCCH 406 may be used for transmitting a first HARQ feedback associated with the PDSCH 404. The UE may receive, from the BS, a second PDCCH 412 that schedules a PSSCH 414 and a second PUCCH 416. The second PUCCH 416 may be used for transmitting a second HARQ feedback associated with the PSSCH 414. The second PUCCH 416 overlaps the first PUCCH 406 in a time domain. The UE may transmit, to the BS, UCI in one of the first PUCCH 406 and the second PUCCH 416, where a part of at least one of the first HARQ feedback and the second HARQ feedback is discarded in the UCI.

Figure 5:
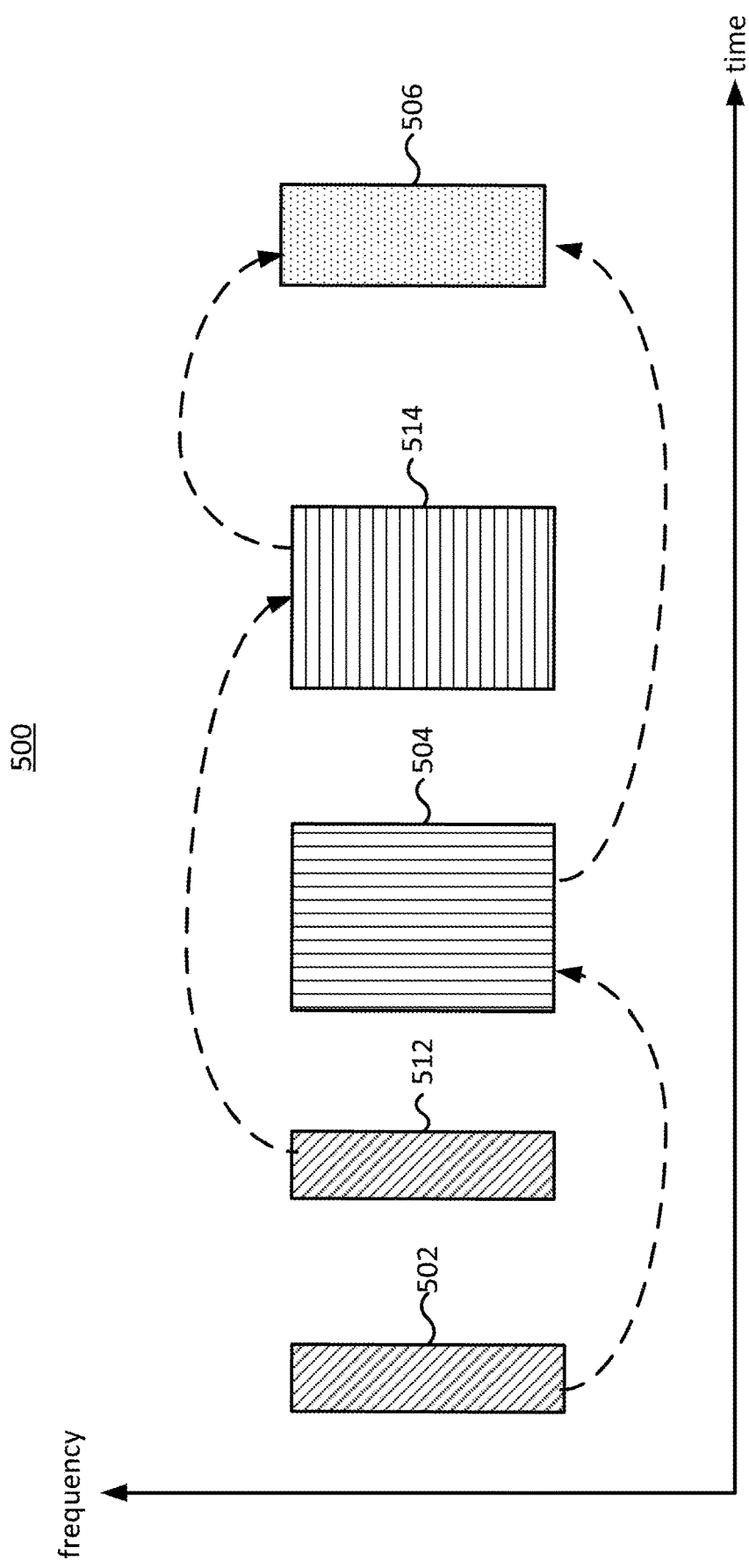
FIG. 5 is a diagram illustrating another example PUCCH conflict scenario according to an example implementation of the present disclosure.

FIG. 5 is a diagram 500 illustrating another example PUCCH conflict scenario according to an example implementation of the present disclosure. In this example, the first PUCCH in action 302 in FIG. 3 and the second PUCCH in action 304 in FIG. 3 are the same, represented as PUCCH 506 in FIG. 5. The UE may receive, from a BS, a first PDCCH 502 that schedules a PDSCH 504 and a PUCCH 506. The PUCCH 506 may be used for transmitting a first HARQ feedback associated with the PDSCH 504. The UE may receive, from the BS, a second PDCCH 512 that schedules a PSSCH 514 and the PUCCH 506. The PUCCH 506 may be used for transmitting a second HARQ feedback associated with the PSSCH 514. The UE may transmit, to the BS, UCI in the PUCCH 506, where a part of at least one of the first HARQ feedback and the second HARQ feedback is discarded in the UCI.

In one implementation, the UE may receive a message that indicates a dedicated resource for the SL HARQ feedback transmission. In one implementation, there may be a new IE SL-PUCCHresource contained in RRC/SL-RRC/SIB/SIB-SL, which indicates PUCCH resource(s) dedicated for the SL HARQ feedback transmission(s). In one implementation, the PUCCH resource dedicated for the SL HARQ feedback transmission may not overlap with a PUCCH resource for UCI transmission (e.g., including DL HARQ feedback) in the time/frequency domain. In one implementation, if the IE SL-PUCCHresource is not present in RRC/SL-RRC/SIB/SIB-SL, the UE may determine that the SL HARQ feedback can be multiplexed with the UCI (e.g., including DL HARQ feedback) on the PUCCH resource.

An example data structure of the IE SL-PUCCHresource is provided as follows:

```
SL-PUCCHresource ::=         SEQUENCE {
  SL-pucch-ResourceId          SL-PUCCH-ResourceId,
  startingPRB                  PRB-Id,
  intraSlotFrequencyHopping    ENUMERATED { enabled }
  secondHopPRB                 PRB-Id
  format                       CHOICE {
    format0                      PUCCH-format0,
    format1                      PUCCH-format1,
    format2                      PUCCH-format2,
    format3                      PUCCH-format3,
    format4                      PUCCH-format4,
  }
}
```

-continued

```
  initialCyclicShift           INTEGER(0.. 11),
  nrofSymbols                  INTEGER (1..2),
  startingSymbolIndex          INTEGER(0..13)
}
```

The IE SL-PUCCHresource may indicate PUCCH resource(s) dedicated for the SL HARQ feedback transmission(s). In one implementation, the UE does not expect that a time/frequency domain resource of any PUCCH resource indicated by the IE SL-PUCCHresource overlaps with a PUCCH resource for UCI transmission. In one implementation, if the IE SL-PUCCHresource is not configured, the UE may multiplex the SL HARQ feedback with the UCI (e.g., including DL HARQ feedback) on the PUCCH resource for the UCI transmission.

In one implementation, the UE may receive a message that indicates whether the SL HARQ feedback can be multiplexed with the UCI (e.g., including DL HARQ feedback) in a single PUCCH. In one implementation, there may be a new IE SL-UCI-MUX contained in RRC/SIB/SIB-SL/SL-RRC, which indicates whether or not the UE can multiplex the UCI (e.g., including DL HARQ feedback) with the SL HARQ feedback. In one implementation, if the IE SL-UCI-MUX is not present in RRC/SIB/SIB-SL/SL-RRC, the UE may determine that the SL HARQ feedback can be multiplexed with the UCI (e.g., including DL HARQ feedback) on the PUCCH resource. In another implementation, if the IE SL-UCI-MUX is not present in RRC/SIB/SIB-SL/SL-RRC, the UE may determine that the SL HARQ feedback cannot be multiplexed with the UCI (e.g., including DL HARQ feedback) on the PUCCH resource.

The IE SL-UCI-MUX may indicate whether or not the UE can multiplex the UCI with the SL HARQ feedback. The IE SL-UCI-MUX may be a one-bit indicator, having a value of either true or false. In one implementation, if the IE SL-UCI-MUX is not configured, the UE may multiplex the SL HARQ feedback with the UCI by default.

In one implementation, the UE may receive a message that indicates whether the SL HARQ feedback can be multiplexed in a PUSCH. In one implementation, there may be a new IE SL-onPUSCH contained in RRC/SIB/SIB-SL/SL-RRC, which indicates whether or not the UE can transmit the SL HARQ feedback on the PUSCH, for example, when a PUCCH resource contains the SL HARQ feedback that overlaps with the PUSCH. In one implementation, if the IE SL-onPUSCH is not present in RRC/SIB/SIB-SL/SL-RRC, the UE may determine that the SL HARQ feedback can be transmitted on the PUSCH. In another implementation, if the IE SL-onPUSCH is not present in RRC/SIB/SIB-SL/SL-RRC, the UE may determine that the SL HARQ feedback cannot be transmitted on the PUSCH.

The IE SL-onPUSCH may indicate whether or not the UE can transmit the SL HARQ feedback on the PUSCH. The IE SL-onPUSCH may be a one-bit indicator, having a value of either true or false. In one implementation, if the IE SL-onPUSCH is not configured, the UE may not transmit the SL HARQ feedback on the PUSCH.

In one implementation, if the UE does not support transmission of the SL HARQ feedback on the PUSCH, the UE may transmit the PUSCH and drop the SL HARQ feedback when the PUCCH resource of the SL HARQ feedback overlaps with the PUSCH. For example, if the UE is indicated to transmit the SL HARQ feedback in slot n+8 by DCI_SL in slot n, and the UE is indicated to transmit the PUSCH in slot n+8 by a DCI format 0_1 in slot n+4, the UE may drop the SL HARQ feedback and transmit only the PUSCH on slot n+8 when the IE SL-onPUSCH has a value of "false."

In one implementation, if the UE supports transmission of the SL HARQ feedback on the PUSCH, the UE may transmit the SL HARQ feedback and drop the PUSCH when the PUCCH resource for the SL HARQ feedback overlaps with the PUSCH.

In one implementation, the ability to multiplex the UCI with SL HARQ feedback may be included in a UE capability. The UE may inform the BS whether it supports multiplexing UCI with the SL HARQ feedback. In one implementation, the UE may transmit, to the BS, a UE capability that indicates whether the UE supports multiplexing the UCI (e.g., including DL HARQ feedback) with the SL HARQ feedback.

In one implementation, there may be a new IE for-SL-HARQ contained in PUCCH resource/PUCCH resource set configuration (e.g., IE PUCCHresource) in RRC/SIB. The IE for-SL-HARQ may be a one-bit indicator, having a value of either true or false. The PUCCH resource/PUCCH resources contained in the PUCCH resource set may contain SL HARQ feedback if the IE for-SL-HARQ has a value of "true."

An example data structure of an IE PUCCHresource is provided as follows:

```
PUCCHresource ::=              SEQUENCE {
   pucch-ResourceId               PUCCH-ResourceId,
   startingPRB                    PRB-Id,
   intraSlotFrequencyHopping      ENUMERATED { enabled }
   secondHopPRB                   PRB-Id
   format                         CHOICE {
      format0                        PUCCH-format0
      format1                        PUCCH-format1,
      format2                        PUCCH-format2,
      format3                        PUCCH-format3,
      format4                        PUCCH-format4,
   }
   PUCCH-format-x ::= SEQUENCE{
      initialCyclicShift             INTEGER(x_0..x_n),
      nrofSymbols                    INTEGER (y_0..y_n),
      startingSymbolIndex            INTEGER(z_0..z_n)
   }
   for-SL-HARQ                    Boolean
}
```

The IE for-SL-HARQ may indicate whether or not the SL HARQ feedback can be transmitted on the PUCCH resource. In one implementation, if the IE for-SL-HARQ is not configured, the UE may not transmit the SL HARQ feedback on the PUCCH.

Referring to the method 300 shown in FIG. 3, in one implementation, the UE may perform a prioritization procedure according to a prioritization rule and a payload size of the first PUCCH or the second PUCCH to determine the UCI in action 306 in FIG. 3. In one implementation, the first PUCCH may be further used for transmitting an SR and a CSI report. The first HARQ feedback may include HARQ control information for a first service type (e.g., eMBB) and HARQ control information for a second service type (e.g., URLLC). The prioritization rule may indicate a prioritization order of the HARQ control information for the first service type, the HARQ control information for the second service type, the SR, and the CSI report.

In one implementation, if a payload size of a PUCCH resource (e.g., the first PUCCH 406 in FIG. 4, the second PUCCH 416 in FIG. 4, or the PUCCH 506 in FIG. 5) cannot contain all SL HARQ feedback and UCI (which may include DL HARQ feedback, SR, CSI) bits, there may be a priority rule to decide which information may be transmitted on the PUCCH resource and which information may be dropped/discarded. In one implementation, the priority order may be URLLC HARQ>eMBB HARQ>SL HARQ>SR>CSI part I>CSI part II. The greater-than sign may be used to indicate priority order in the present disclosure. For example, URLLC HARQ>eMBB HARQ means URLLC HARQ has higher priority than eMBB HARQ. It should be noted that eMBB and URLLC here refer to the eMBB service and the URLLC service via the Uu interface.

The UE may differentiate eMBB service from URLLC service on the Uu interface in several ways. In one implementation, the UE may treat data in PDSCH as the URLLC service when there is an indicator contained in the scheduling DCI. In one implementation, the UE may treat data in PDSCH as the URLLC service according to a DCI format. In one implementation, the UE may treat data in PDSCH as the URLLC service according to sub-slot numerology for HARQ feedback. In one implementation, the UE may treat data in PDSCH as the URLLC service according to a radio network temporary identifier (RNTI). In one implementation, the UE may treat data in PDSCH as the URLLC service according to a modulation and coding scheme (MCS) table for the PDSCH.

For example, a UE may be indicated to transmit SL HARQ feedback on PUCCH resource #3 and the UE may be also indicated to transmit Uu HARQ feedback and CSI feedback on PUCCH resource #3. The priority order may be URLLC HARQ>eMBB HARQ>SL HARQ>SR>CSI part I>CSI part II. If {the number of SL HARQ feedback bits (O_SL_ACK)+the number of Uu HARQ feedback bits (O_ACK)+the number of CSI feedback bits (O_CSI)+the total number of CRC bits for SL HARQ, Uu HARQ and CSI feedback (O_CRC)} is greater than the payload size of PUCCH resource #3, the UE may drop the CSI feedback first and then drop SL HARQ feedback bits until {O_SL_ACK+O_ACK+O_CSI+O_CRC} is less than the payload size of PUCCH resource #3. The payload size of the PUCCH resource may be related to the number of PRBs, the number of symbols, modulation and/or code rate.

In one implementation, the second PDCCH (e.g., the second PDCCH 412 in FIG. 4, or the second PDCCH 512 in FIG. 5) may contain SCI that schedules the PSSCH (e.g., the PSSCH 414 in FIG. 4, or the PSSCH 514 in FIG. 5) and includes a priority indicator of the second HARQ feedback. The priority of the SL HARQ feedback may depend on a priority information indicator (e.g., ProSe per-packet priority (PPPP)) in the scheduling SCI. In one implementation, a priority indicator having a smaller value may indicate a higher priority.

In one implementation, there may be an index configured in RRC signaling for UCI of eMBB (e.g., eMBB HARQ feedback, eMBB SR, or eMBB CSI feedback). The index may indicate a threshold for dropping the UCI of eMBB. If the priority indicator in the scheduling SCI has a value less than the configured index for the UCI of eMBB, the UE may drop the UCI for eMBB. Otherwise, the UE may drop the SL HARQ feedback.

For example, a UE is configured with an index (e.g., "3") for dropping eMBB UCI, and PPPP in SCI or DCI_SL is "2". The UE may drop the eMBB UCI if the PUCCH resource for the eMBB UCI overlaps the PUCCH resource for the SL HARQ feedback that is associated with the PSSCH scheduled by the SCI or the DCI_SL.

In one implementation, there may be an index configured in RRC signaling for UCI of URLLC (e.g., URLLC HARQ feedback, URLLC SR, or URLLC CSI feedback). The index may indicate a threshold for dropping the UCI of URLLC. If the priority indicator in the scheduling SCI has a value less than the configured index for the UCI of URLLC, the UE may drop the UCI for URLLC. Otherwise, the UE may drop the SL HARQ feedback.

In one implementation, SL HARQ feedback and UCI (e.g., including DL HARQ feedback) may be independently reported. Referring to the method 300 shown in FIG. 3, in one implementation, one of the first HARQ feedback and the second HARQ feedback may be discarded in the UCI in action 306. The UCI may include only one of the first HARQ feedback and the second HARQ feedback.

In one implementation, if the time/frequency domain of a PUCCH resource for SL HARQ feedback overlaps a PUCCH resource for DL HARQ feedback, there may be a priority rule to decide which information may be transmitted on the PUCCH resource. In one implementation, the priority order may be PUCCH resource containing URLLC HARQ>PUCCH resource containing eMBB HARQ>PUCCH resource containing SL HARQ>PUCCH resource containing SR>PUCCH resource containing CSI part I>PUCCH resource containing CSI part II.

For example, a UE may be indicated to transmit SL HARQ feedback on SL-PUCCH resource #3 in the $10^{th}$ and $11^{th}$ symbols of the slot n and the UE may be also indicated to transmit Uu HARQ feedback and CSI feedback on PUCCH resource #2 in the $9^{th}$ and $10^{th}$ symbols of the slot n. The priority order may be URLLC HARQ>eMBB HARQ>SL HARQ>SR>CSI part I>CSI part II. Since the SL-PUCCH resource #3 partially overlaps the PUCCH resource #2, the UE may drop the SL-PUCCH resource #3 for the SL HARQ feedback and only transmit the PUCCH resource #2 for the Uu HARQ feedback in the slot n.

In one implementation, the second PDCCH (e.g., the second PDCCH 412 in FIG. 4, or the second PDCCH 512 in FIG. 5) may contain SCI that schedules the PSSCH (e.g., the PSSCH 414 in FIG. 4, or the PSSCH 514 in FIG. 5) and includes a priority indicator of the second HARQ feedback. The priority of the SL HARQ feedback may depend on a priority information indicator (e.g., PPPP) in the scheduling SCI. In one implementation, the priority of a PUCCH resource may depend on the highest priority of UCI contained in the PUCCH resource. In one implementation, a priority indicator having a smaller value may indicate a higher priority.

In one implementation, there may be an index configured in RRC signaling for UCI of eMBB (e.g., eMBB HARQ feedback, eMBB SR, or eMBB CSI feedback). The index may indicate a threshold for dropping the UCI of eMBB. If the priority indicator in the scheduling SCI has a value less than the configured index for the UCI of eMBB, the UE may drop the UCI for eMBB.

In one implementation, there may be an index configured in RRC signaling for UCI of URLLC (e.g., URLLC HARQ feedback, URLLC SR, or URLLC CSI feedback). The index may indicate a threshold for dropping the UCI of URLLC. If the priority indicator in the scheduling SCI has a value less than the configured index for the UCI of URLLC, the UE may drop the UCI for URLLC.

For example, a UE is configured with an index (e.g., "3") for dropping URLLC UCI, and PPPP in SCI or DCI_SL is "2". The UE may drop the URLLC UCI if the PUCCH resource for the URLLC UCI overlaps with the PUCCH resource for the SL HARQ feedback that is associated with the PSSCH scheduled by the SCI or the DCI_SL.

Figure 6:
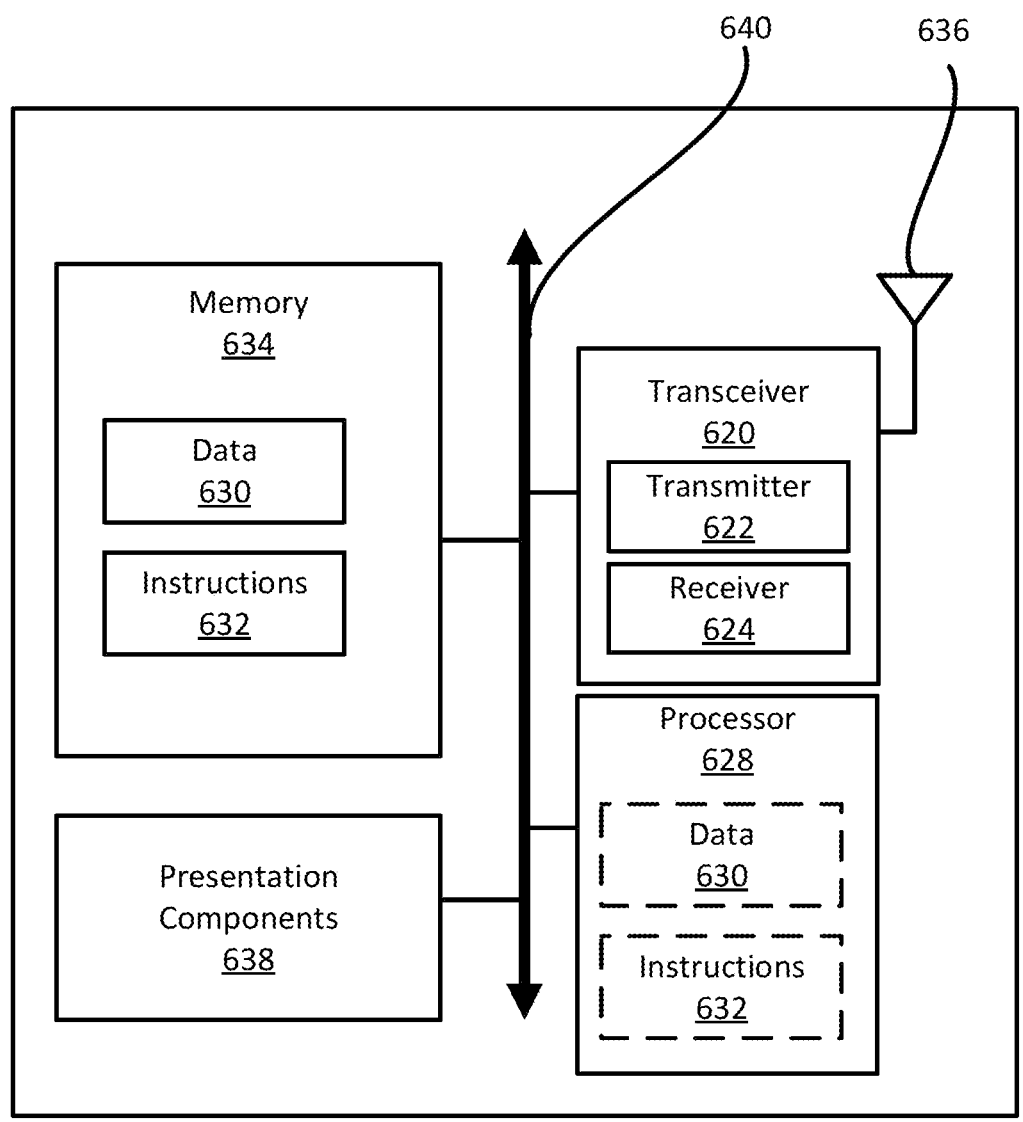
FIG. 6 is a block diagram illustrating a node for wireless communication in accordance with various aspects of the present disclosure.

FIG. 6 is a block diagram illustrating a node 600 for wireless communication according to the present disclosure. As illustrated in FIG. 6, the node 600 may include a transceiver 620, a processor 628, a memory 634, one or more presentation components 638, and at least one antenna 636. The node 600 may also include an RF spectrum band module, a BS communications module, a network communications module, and a system communications management module, Input/Output (I/O) ports, I/O components, and a power supply (not shown).

Each of the components may directly or indirectly communicate with each other over one or more buses 640. The node 600 may be a UE or a BS that performs various functions disclosed with reference to FIGS. 1 through 5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof.

Example memory includes solid-state memory, hard drives, optical-disc drives, etc. As illustrated in FIG. 6, the memory 634 may store computer-readable, computer-executable instructions 632 (e.g., software codes) that are configured to cause the processor 628 to perform various disclosed functions with reference to FIGS. 1 through 5. Alternatively, the instructions 632 may not be directly executable by the processor 628 but be configured to cause the node 600 (e.g., when compiled and executed) to perform various functions disclosed herein.

The processor 628 (e.g., having processing circuitry) may include an intelligent hardware device, e.g., a Central Processing Unit (CPU), a microcontroller, an ASIC, etc. The processor 628 may include memory.

The processor 628 may process the data 630 and the instructions 632 received from the memory 634, and information transmitted and received via the transceiver 620, the base band communications module, and/or the network communications module. The processor 628 may also process information to be sent to the transceiver 620 for transmission via the antenna 636 to the network communications module for transmission to a core network.

One or more presentation components 638 present data to a person or another device. Examples of presentation components 638 include a display device, a speaker, a printing component, and a vibrating component.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) for transmitting a hybrid automatic repeat request (HARQ) feedback, the UE comprising:
    one or more non-transitory computer-readable media storing one or more computer-executable instructions; and
    at least one processor coupled to the one or more non-transitory computer-readable media, the at least one processor configured to execute the one or more computer-executable instructions to cause the UE to:
    receive, from a base station (BS), a physical uplink control channel (PUCCH) configuration for configuring a PUCCH, the PUCCH configuration indicating a specific PUCCH format of the PUCCH and whether a sidelink (SL) HARQ feedback is allowed to be transmitted on the PUCCH;
    generate a first HARQ feedback in response to first data received from the BS via a physical downlink shared channel (PDSCH);
    generate a second HARQ feedback in response to second data received from another UE via a physical sidelink shared channel (PSSCH); and
    transmit, to the BS, uplink control information (UCI) including at least a portion of the first HARQ feedback and at least a portion of the second HARQ feedback via the PUCCH in a case that the PUCCH configuration indicates that the SL HARQ feedback is allowed to be transmitted on the PUCCH and a first PUCCH for the first HARQ feedback overlaps a second PUCCH for the second HARQ feedback in time domain,
    wherein another portion of at least one of the first HARQ feedback and the second HARQ feedback is discarded in the UCI.

2. The UE of claim 1, wherein the specific PUCCH format is one of a PUCCH format 0, a PUCCH format 1, a PUCCH format 2, a PUCCH format 3, and a PUCCH format 4.

3. The UE of claim 1, wherein the at least one processor is further configured to execute the one or more computer-executable instructions to cause the UE to:
    transmit one of the first HARQ feedback and the second HARQ feedback in a case that the PUCCH configuration indicates that the SL HARQ feedback is not allowed to be transmitted on the PUCCH and the first PUCCH for the first HARQ feedback overlaps the second PUCCH for the second HARQ feedback in the time domain.

4. The UE of claim 3, wherein the at least one processor is further configured to execute the one or more computer-executable instructions to cause the UE to:
    perform a prioritization procedure to determine which one of the first HARQ feedback and the second HARQ feedback is to be transmitted.

5. The UE of claim 1, wherein the at least one processor is further configured to execute the one or more computer-executable instructions to cause the UE to:
    transmit, to the BS, a UE capability that indicates whether the UE supports multiplexing the first HARQ feedback with the second HARQ feedback.

6. The UE of claim 1, wherein the at least one processor is further configured to execute the one or more computer-executable instructions to cause the UE to:
    perform a prioritization procedure according to the first HARQ feedback, the second HARQ feedback, a prioritization rule, and a payload size of the PUCCH to determine the UCI.

7. The UE of claim 1, wherein the PSSCH is scheduled by sidelink control information (SCI) that includes a priority indicator of the second HARQ feedback.

8. The UE of claim 6, wherein:
    the PUCCH is further used for transmitting a scheduling request (SR) and a channel state information (CSI) report,
    the first HARQ feedback includes HARQ control information for a first service type and HARQ control information for a second service type, and
    the prioritization rule indicates a prioritization order of the HARQ control information for the first service type, the HARQ control information for the second service type, the SR, and the CSI report.

9. The UE of claim 1, wherein the at least one processor is further configured to execute the one or more computer-executable instructions to cause the UE to:
    receive a message that indicates whether a HARQ codebook type of the second HARQ feedback is semi-static or dynamic.

10. A method for transmitting a hybrid automatic repeat request (HARQ) feedback by a user equipment (UE), the method comprising:
    receiving, from a base station (BS), a physical uplink control channel (PUCCH) configuration for configuring a PUCCH, the PUCCH configuration indicating a specific PUCCH format of the PUCCH and whether a sidelink (SL) HARQ feedback is allowed to be transmitted on the PUCCH;
    generating a first HARQ feedback in response to first data received from the BS via a physical downlink shared channel (PDSCH);
    generating a second HARQ feedback in response to second data received from another UE via a physical sidelink shared channel (PSSCH); and
    transmitting, to the BS, uplink control information (UCI) including at least a portion of the first HARQ feedback and at least a portion of the second HARQ feedback via the PUCCH in a case that the PUCCH configuration indicates that the SL HARQ feedback is allowed to be transmitted on the PUCCH and a first PUCCH for the first HARQ feedback overlaps a second PUCCH for the second HARQ feedback in time domain, wherein another portion of at least one of the first HARQ feedback and the second HARQ feedback is discarded in the UCI.

11. The method of claim 10, further comprising:

transmitting one of the first HARQ feedback and the second HARQ feedback in a case that the PUCCH configuration indicates that the SL HARQ feedback is not allowed to be transmitted on the PUCCH and the first PUCCH for the first HARQ feedback overlaps the second PUCCH for the second HARQ feedback in the time domain.

12. The method of claim 11, further comprising:

performing a prioritization procedure to determine which one of the first HARQ feedback and the second HARQ feedback is to be transmitted.

13. The method of claim 10, further comprising:

transmitting, to the BS, a UE capability that indicates whether the UE supports multiplexing the first HARQ feedback with the second HARQ feedback.

14. The method of claim 10, further comprising:

performing a prioritization procedure according to the first HARQ feedback, the second HARQ feedback, a prioritization rule, and a payload size of the PUCCH to determine the UCI.

15. The method of claim 14, wherein:

the PUCCH is further used for transmitting a scheduling request (SR) and a channel state information (CSI) report, the first HARQ feedback includes HARQ control information for a first service type and HARQ control information for a second service type, and the prioritization rule indicates a prioritization order of the HARQ control information for the first service type, the HARQ control information for the second service type, the SR, and the CSI report.

16. The method of claim 10, wherein the PSSCH is scheduled by sidelink control information (SCI) that includes a priority indicator of the second HARQ feedback.

17. The method of claim 10, wherein the specific PUCCH format is one of a PUCCH format 0, a PUCCH format 1, a PUCCH format 2, a PUCCH format 3, and a PUCCH format 4.

18. The method of claim 10, further comprising:

receiving a message that indicates whether a HARQ codebook type of the second HARQ feedback is semi-static or dynamic.

* * * * *